3,062,799
2-(2,2,2-TRIFLUOROETHOXY)-BUTADIENE AND POLYMERS THEREOF
Paul Tarrant and Eugene C. Stump, Jr., Alachua County, Fla., assignors to the United States of America as represented by the Secretary of the Army
No Drawing. Filed June 8, 1961, Ser. No. 126,396
10 Claims. (Cl. 260—91.1)

This invention relates to a 2-substituted fluoroalkoxy butadiene, 2-(2,2,2-trifluoroethoxy)-butadiene in monomeric and polymeric form, and to the synthesis of this compound.

The synthesis of 2-(2,2,2-trifluoroethoxy)-butadiene is summarized by the following reactions.

Step 1—Adduct formation:

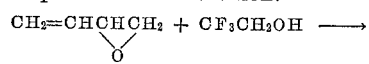

$$CH_2=CHCH(OCH_2CF_3)CH_2OH$$

Step 2—Halogenation:

$$CH_2=CHCH(OCH_2CF_3)CH_2OH \xrightarrow{SOCl_2}$$
$$CH_2=CHCH(OCH_2CF_3)CH_2Cl$$

Step 3—Dehydrohalogenation:

$$CH_2=CHCH(OCH_2CF_3)CH_2Cl \xrightarrow{-HCl}$$
$$CH_2=CHC(OCH_2CF_3)=CH_2$$

Step 1 preferably takes place in the presence of an acid catalyst, such as sulfuric acid. Step 2 is preferably carried out in the presence of a catalyst, such as pyridine. The preferred dehydrohalogenating agent for Step 3 is an alcoholic solution of potassium hydroxide.

The resulting 2-(2,2,2-trifluoroethoxy)-butadiene, $$CH_2=CHC(OCH_2CF_3)—CH_2$$

is a liquid at room temperature (B.P. 93° C.), and polymerizes spontaneously at room temperature to a white elastomeric substance. The elastomer is useful as insulating material, padding, or a cushion filling. When it is desired to keep the 2-(2,2,2-trifluoroethoxy)-butadiene in the monomeric state, its polymerization can be inhibited with a suitable substance such as hydroquinone.

The following example illustrates more fully the synthesis of 2-(2,2,2-trifluoroethoxy)-butadiene outlined above. It will be understood, however, that the conditions set forth are for purposes of illustration and are not intended to limit the scope of the invention.

EXAMPLE (a) Preparation of $CH_2=CHCH(OCH_2CF_3)CH_2OH$

A solution of 0.5 g. sulfuric acid in 530 g. (5.30 mols) trifluoroethanol was heated to reflux and 50 g. (0.71 mol) 3,4-epoxybutene-1 added dropwise with stirring over a one hour period. Stirring at reflux was continued for two hours, followed by the addition of 10 g. potassium carbonate. The solution was stirred overnight at room temperature, the unreacted material stripped and the remainder fractionated to give 46 g. (38% conversion) of $CH_2=CH—CH(OCH_2CF_3)CH_2OH$. An analytical fraction had the following properties: B.P. 86°/55 mm., $n_D^{23}$ 1.3797, $d^{23}$ 1.198.

Analysis.—Calcd. for $C_6H_9F_3O_2$: $MR_D$, 32.61; percent C, 42.35; percent H, 5.33. Found: $MR_D$, 32.92; percent C, 42.37; percent H, 5.46.

(b) Preparation of $CH_2=CHCH(OCH_2CF_3)CH_2Cl$

A solution of 47.5 g. (0.6 mol) of pyridine and 102 g. (0.6 mol) of $CH_2=CHCH(OCH_2CF_3)CH_2OH$ was cooled to 0° and 116 g. (0.98 mol) of thionyl chloride added dropwise with stirring. The mixture was then heated with stirring at 75° for two hours, washed with dilute hydrochloric acid and extracted with ethyl ether, dried and fractionated to give 68 g. (60% conversion) of $CH_2=CHCH(OCH_2CF_3)CH_2Cl$. An analytical sample had the following properties: B.P. 66°/55 mm., $n_D^{20}$ 1.3852, $d^{20}$ 1.209.

Analysis.—Calcd. for $C_6H_8ClF_3O$: $MR_D$, 35.95; percent C, 38.21; percent H, 5.28; percent Cl, 18.80. Found: $MR_D$ 36.60; percent C, 38.13; percent H, 4.31; percent Cl, 18.69.

(c) Preparation of $CH_2=C(OCH_2CF_3)CH=CH_2$

A solution of 40 g. (0.64 mol) of potassium hydroxide in 220 ml. methanol was heated to reflux and 65 g. (0.345 mol) of $CH_2=CHCH(OCH_2CF_3)CH_2Cl$ added and stirred for one and one-half hours. The salt was removed by filtration and the solution washed with water to give an insoluble organic layer which was separated, dried and fractionated to give 20 g. (38% conversion) of $$CH_2=C(OCH_2CF_3)CH=CH_2$$

Hydroquinone (0.1 g.) was added to the compound to prevent polymerization. A chromatographically pure sample had the following properties: B.P. 35°/95 mm. and 93°/760 mm., $n_D^{21}$ 1.3778, $d^{21}$ 1.116.

Analysis.—Calcd. for $C_6H_7F_3O$: $MR_D$, 30.62; percent C, 47.37; percent H, 4.64. Found: $MR_D$, 31.41; percent C, 47.62; percent H, 4.79.

It is assumed that optical exaltation may account for the high value observed for the molar refractivity.

A stoichiometric equivalent of a non-fluoro thionyl halide, such as thionyl bromide ($SOBr_2$) may be substituted for the thionyl chloride ($SOCl_2$) of Reaction b, for the purpose of replacing the terminal hydroxyl group of the primary alcohol formed as the adduct of Reaction a by a halogen atom other than fluorine. In either case, i.e., regardless whether thionyl chloride or thionyl bromide are used, the dehydrohalogenation step of Reaction c results in the removal of one mol of hydrogen halide (other than hydrogen fluoride) per mol of the product of Reaction b, which results in the formation of the desired end product 2-(2,2,2-trifluoroethoxy)-butadiene.

Having thus described the principle of the invention and a preferred way of carrying the same into practice, it will be understood that modifications and departures will readily occur to the expert and are deemed to be included within the scope of the invention, which is defined by the appended claims.

We claim:
1. 2-(2,2,2-trifluoroethoxy)-butadiene.
2. Polymeric 2-(2,2,2-trifluoroethoxy)-butadiene.
3. The process of preparing 2-(2,2,2-trifluoroethoxy)-butadiene, comprising reacting 3,4-epoxybutene-1 and trifluoroethanol to form an adduct having a terminal hydroxy group, replacing said terminal hydroxyl group by a halogen atom other than fluorine, and removing one mol of hydrogen halide other than hydrogen fluoride to form 2-(2,2,2-trifluoroethoxy)-butadiene.
4. The process of preparing 2-(2,2,2-trifluoroethoxy)-butadiene, comprising reacting 3,4-epoxybutene-1 and trifluoroethanol to form an adduct having a terminal hydroxyl group, reacting said adduct with a thionyl halide other than thionyl fluoride to replace the hydroxyl group of said adduct by a halogen atom other than fluorine, and removing one mol of hydrogen halide other than hydrogen fluoride from the product of said last-named reaction to form 2-(2,2,2-trifluoroethoxy)-butadiene.
5. The process according to claim 3, wherein said adduct is formed in the presence of an acidic catalyst.
6. The process according to claim 5, wherein said catalyst is sulfuric acid.
7. The process according to claim 4, wherein said adduct is reacted with said thionyl halide in the presence of pyridine as a catalyst.

8. The process according to claim 3, wherein said hydrogen halide is removed by alcoholic potassium hydroxide.

9. The process according to claim 4, wherein said hydrogen halide is removed by alcoholic potassium hydroxide.

10. The process of preparing 2-(2,2,2-trifluoroethoxy)-butadiene, comprising reacting 3,4-epoxybutene-1 and trifluoroethanol in the presence of sulfuric acid to form an adduct having a terminal hydroxyl group, reacting said adduct with thionyl chloride in the presence of pyridine to replace said terminal hydroxyl group by chlorine, and removing one mol of hydrogen chloride from said reaction product in the presence of alcoholic potassium hydroxide to form 2-(2,2,2-trifluoroethoxy)-butadiene.

No references cited.